United States Patent
Jeong

(10) Patent No.: US 10,176,600 B2
(45) Date of Patent: Jan. 8, 2019

(54) TEXTURE PROCESSING METHOD AND UNIT

(71) Applicant: Samsung Electronics Co., Ltd., Suwon-si, Gyeonggi-do (KR)

(72) Inventor: Seong-hun Jeong, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 31 days.

(21) Appl. No.: 15/609,828

(22) Filed: May 31, 2017

(65) Prior Publication Data
US 2018/0122104 A1    May 3, 2018

(30) Foreign Application Priority Data
Nov. 2, 2016 (KR) .................. 10-2016-0145215

(51) Int. Cl.
G06T 11/00    (2006.01)
G06T 15/04    (2011.01)

(52) U.S. Cl.
CPC ............ *G06T 11/001* (2013.01); *G06T 15/04* (2013.01); *G06T 2210/36* (2013.01)

(58) Field of Classification Search
CPC .... G06T 11/001; G06T 15/04; G06T 2210/36
USPC ....... 345/582, 583, 584, 585, 586, 587, 588; 708/290
See application file for complete search history.

(56) References Cited

U.S. PATENT DOCUMENTS

| | | | |
|---|---|---|---|
| 5,922,043 A * | 7/1999 | Mais ..................... | G06T 3/4007 708/290 |
| 6,304,268 B1 | 10/2001 | Iourcha et al. | |
| 7,079,156 B1 | 7/2006 | Hutchins et al. | |
| 7,193,627 B1 | 3/2007 | Donovan et al. | |
| 7,355,603 B2 | 4/2008 | Donovan et al. | |
| 7,436,412 B2 * | 10/2008 | Challa ..................... | G06T 11/40 345/606 |
| 7,538,773 B1 * | 5/2009 | Hutchins ............... | G06T 15/005 345/506 |

(Continued)

FOREIGN PATENT DOCUMENTS

KR    2016-0059237 A    5/2016

OTHER PUBLICATIONS

Jean-Francois Roy: "WWDC 2010 Session 419—OpenGL ES Tuning and Optimization", Transcript of session 419 at Worldwide Developpers Conference, Jun. 7-11, 2010, pp. 1-29.

(Continued)

*Primary Examiner* — King Poon
*Assistant Examiner* — Vincent Peren
(74) *Attorney, Agent, or Firm* — Harness, Dickey & Pierce, P.L.C.

(57) ABSTRACT

A texture processing unit includes a controller configured to determine a first calculator that performs a calculation on a first mipmap and a second calculator that performs a calculation on a second mipmap, based on a level of detail (LOD) weight indicating influences of the first mipmap and the second mipmap on texture filtering, the influences being based on an LOD value of graphics; and a texture filter configured to perform the texture filtering by using the first calculator and the second calculator, wherein a calculation precision of the first calculator is different from a calculation precision of the second calculator.

20 Claims, 13 Drawing Sheets

(56) References Cited

U.S. PATENT DOCUMENTS

| | | | |
|---|---|---|---|
| 7,652,673 B1* | 1/2010 | Rice | G06T 15/04 |
| | | | 345/582 |
| 7,982,745 B1 | 7/2011 | Donovan et al. | |
| 9,367,948 B2 | 6/2016 | Peng et al. | |
| 2003/0030646 A1 | 2/2003 | Yeh | |
| 2006/0268005 A1* | 11/2006 | Hutchins | G06T 11/40 |
| | | | 345/606 |
| 2007/0008333 A1 | 1/2007 | Xu | |
| 2016/0140688 A1 | 5/2016 | Lee et al. | |
| 2016/0180548 A1* | 6/2016 | Kamenetskaya | G06T 1/20 |
| | | | 345/582 |

OTHER PUBLICATIONS

Anonymous: "Outline.tex", 1-20, Sep. 28, 2006 (Sep. 28, 2006), pp. 1-41.
Anonymous: "Android Lession Six: An Introduction to Texture Filtering", Learn OpenGL ES, Feb. 24, 2012 (Feb. 24, 2012), pp. 1-12.
Extended European Search Report issued in Application No. 171785736 dated Nov. 30, 2017.

* cited by examiner

| METHOD | POINT FILTERING | BILINEAR FILTERING | TRILINEAR FILTERING |
|---|---|---|---|
| CONTENT | | | |
| NECESSARY CALCULATIONS | NO LINEAR INTERPOLATION | BILINEAR INTERPOLATION ONE TIME = LINEAR INTERPOLATION THREE TIMES | TRILINEAR INTERPOLATION ONE TIME = BILINEAR INTERPOLATION TWO TIMES + LINEAR INTERPOLATION ONE TIME = LINEAR INTERPOLATION SEVEN TIMES |

FIG. 13

| CALCULATOR CONFIGURATION | FINAL CALCULATION AMOUNT (RATIO) | ERROR MAXIMUM VALUE |
|---|---|---|
| 8x8 + 8x8 | 100% | 0 (out of 256) |
| 8x8 + 8x7 | 94.6% | 1 |
| 8x8 + 8x6 | 89.2% | 2 |
| 8x8 + 8x5 | 83.9% | 3.5 |
| 8x8 + 8x4 | 78.5% | 5.5 |
| 8x8 + 8x3 | 73.2% | 11.5 |
| 8x8 + 8x2 | 68.5% | 23 |
| 8x8 + 8x1 | 62.5% | 44 |
| 8x8 + 8x0 | 57.1% | 100 ↑ |

—1310 (highlighting row 8x8 + 8x4)

FIG. 14

START

DETERMINE FIRST CALCULATOR THAT PERFORMS CALCULATION ON FIRST MIPMAP AND SECOND CALCULATOR THAT PERFORMS CALCULATION ON SECOND MIPMAP, BASED ON LOD WEIGHT INDICATING INFLUENCES OF FIRST MIPMAP AND SECOND MIPMAP ON TEXTURE FILTERING WHICH ARE DETERMINED ACCORDING TO LOD VALUE OF GRAPHICS —1410

PERFORM TEXTURE FILTERING BY USING FIRST CALCULATOR AND SECOND CALCULATOR —1420

END

TEXTURE PROCESSING METHOD AND UNIT

CROSS-REFERENCE TO RELATED APPLICATION

This application claims priority under 35 U.S.C. § 119 to Korean Patent Application No. 10-2016-0145215, filed on Nov. 2, 2016, in the Korean Intellectual Property Office, the disclosure of which is incorporated herein in its entirety by reference.

BACKGROUND

1. Field

At least some example embodiments of the inventive concepts relate to a texture processing method and unit.

2. Field

Texturing or texture mapping is used to obtain a more realistic image in a three-dimensional (3D) graphics system. Texturing or texture mapping refers to a method performed by a texture processing unit to define a two-dimensional (2D) image on a surface of a 3D object in order to apply a texture to the surface of the 3D object. The term 'texture' refers to an image applied to an object. In texture mapping, a bitmap image set including a basic texture and downsized textures thereof is referred as a mipmap.

Since the number of mipmaps stored in a texture processing unit is limited, the texture processing unit may perform texture filtering to more precisely represent a surface of an object through interpolation using the mipmaps.

In this case, the texture processing unit may perform texture filtering by using a plurality of mipmaps. In this case, as the number of used mipmaps increases, the surface of the object may be more precisely represented whereas an area, a calculation amount, and power consumption of the texture processing unit for processing various mipmaps may increase.

SUMMARY

At least some example embodiments of the inventive concepts provide a texture processing method and unit for performing texture filtering by varying a precision of a calculation performed on a first mipmap and a precision of a calculation performed on a second mipmap according to influences of the first mipmap and the second mipmap on the texture filtering, in such a manner that an amount of area, calculating and/or power consumption used for performing the texture processing may be reduced, while maintaining a quality level of three-dimensional (3D) graphics resulting from the texture processing.

According to at least some example embodiments of the inventive concepts, a texture processing unit includes a controller configured to determine a first calculator that performs a calculation on a first mipmap and a second calculator that performs a calculation on a second mipmap, based on a level of detail (LOD) weight indicating influences of the first mipmap and the second mipmap on texture filtering, the influences being based on an LOD value of graphics; and a texture filter configured to perform the texture filtering by using the first calculator and the second calculator, wherein a calculation precision of the first calculator is different from a calculation precision of the second calculator.

According to at least some example embodiments of the inventive concepts, a texture processing method includes determining a first calculator that performs a calculation on a first mipmap and a second calculator that performs a calculation on a second mipmap, based on a level of detail (LOD) weight indicating influences of the first mipmap and the second mipmap on texture filtering which are determined according to an LOD value of graphics; and performing the texture filtering by using the first calculator and the second calculator, wherein a calculation precision of the first calculator is different from a calculation precision of the second calculator.

According to at least some example embodiments of the inventive concepts, a texture processing apparatus includes a controller; and a texture filter circuit including plurality of calculators having a plurality of different precisions, respectively, the controller being configured to, determine a level of detail (LOD) value of an image, determine an LOD weight based on the LOD value, select a first calculator having first precision and a second calculator having a second precision based on the LOD weight, control the first calculator to perform a first calculation on a first mipmap, and control the second calculator to perform a second calculation on a second mipmap, the first and second calculators being calculators from among the plurality of calculators, the first and second precisions being different precisions.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 13 is a diagram for explaining a change in a calculation amount of texture filtering according to at least one example embodiment of the inventive concepts;

FIG. 14 is a flowchart of a texture processing method according to at least one example embodiment of the inventive concepts.

DETAILED DESCRIPTION OF THE EMBODIMENTS

Figure 1:
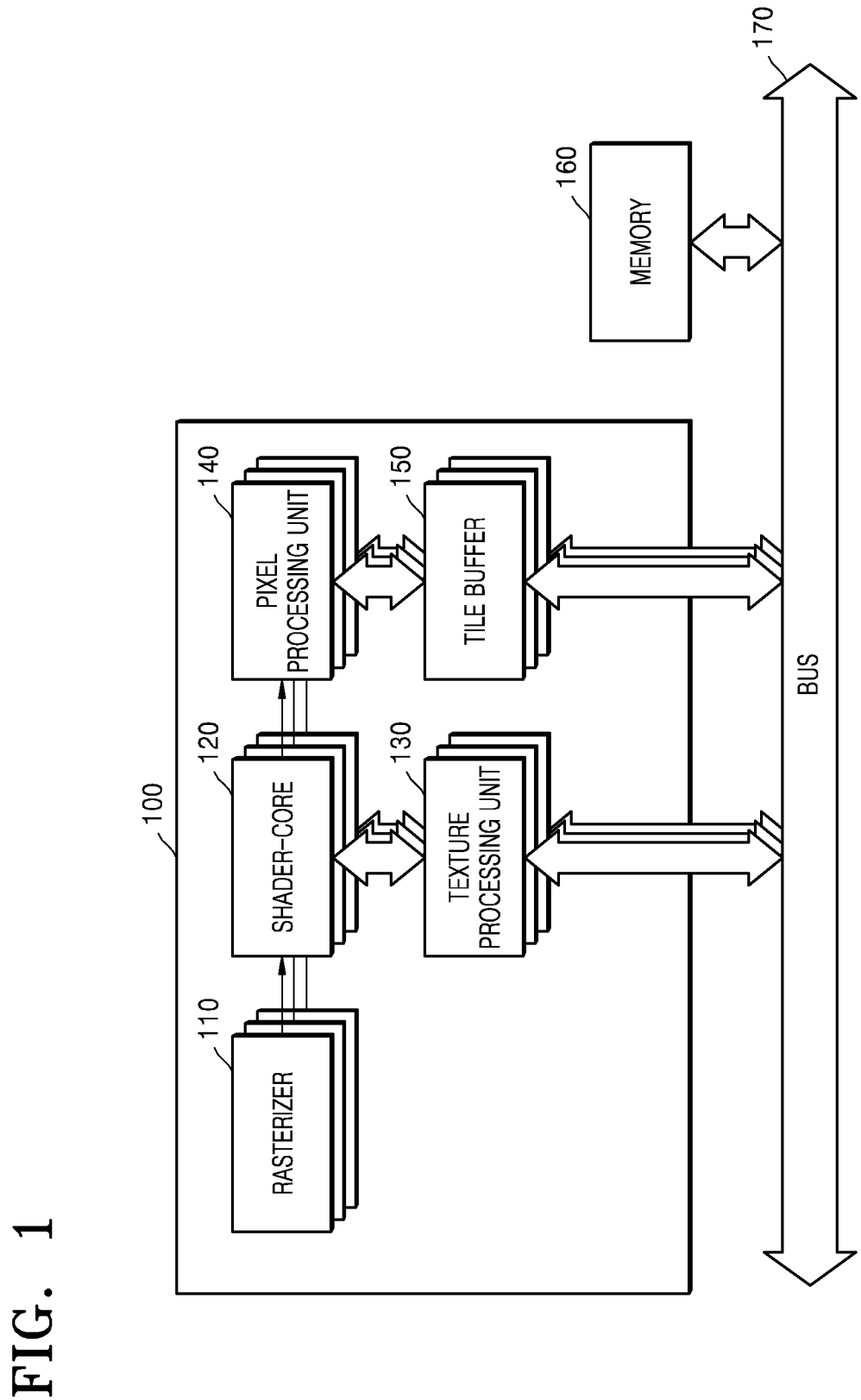
FIG. 1 is a diagram of a graphics processing apparatus according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Further, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a diagram of a graphics processing apparatus 100 according to at least one example embodiment of the inventive concepts.

It will be understood by one of ordinary skill in the art that the graphics processing apparatus 100 may further include elements other than elements illustrated in FIG. 1.

Referring to FIG. 1, the graphics processing apparatus 100 may include a rasterizer 110, a shader core 120, a texture processing unit 130, a pixel processing unit 140, and a tile buffer 150. The graphics processing apparatus 100 may transmit/receive data to/from a memory 160 outside the graphics processing apparatus 100 via a bus 170. According to at least some example embodiments of the inventive concepts, the graphics processing apparatus 100 (and elements thereof) may be embodied by a processor. For example, according to at least some example embodiments, the graphics processing apparatus 100 is a graphics processing unit (GPU). According to at least some example embodiments, the graphics processing apparatus 100 may be implemented by a processor (e.g., a central processing unit (CPU), GPU, microprocessor, multi-core processor, application-specific integrated circuit (ASIC) and/or multiprocessor) executing computer-executable program code.

In FIG. 1, the graphics processing apparatus 100 for processing three-dimensional (3D) graphics may use tile-based rendering (TBR). In other words, in order to generate 3D graphics corresponding to one frame, the graphics processing apparatus 100 may allow a plurality of tiles that are divided to have desired or, alternatively, predetermined sizes to pass through the rasterizer 110, the shader core 120, and the pixel processing unit 140 and may allow a processing result to be stored in the tile buffer 150. The graphics processing apparatus 100 may process all of tiles constituting a frame in parallel by using a plurality of channels each of which includes the rasterizer 110, the shader core 120, and the pixel processing unit 140. Once a plurality of tiles corresponding to one frame is processed, the graphics processing apparatus 100 may transmit a processing result stored in the tile buffer 150 to a frame buffer (not shown) of the memory 160.

The rasterizer 110 may rasterize a primitive generated from a vertex shader through geometric transformation.

The shader core 120 may receive the primitive rasterized by the rasterizer 110 and may perform pixel shading. The shader core 120 may perform the pixel shading to determine colors of all of pixels constituting titles including fragments of the rasterized primitive. The shader core 120 may use a pixel value generated by using a texture in order to generate stereoscopic and realistic 3D graphics during the pixel shading.

The shader core 120 may include a pixel shader. Further, the shader core 120 may be a type further including a vertex shader or a unified shader in which a vertex shader and a pixel shader are combined with each other. When the shader core 120 functions as a vertex shader, the shader core 120 may generate a primitive that represents an object and may transmit the primitive to the rasterizer 110.

When the shader core 120 requests the texture processing unit 130 to send a pixel value corresponding to a desired pixel, the texture processing unit 130 may transmit a pixel value generated by processing a texture that is previously prepared. The texture may be stored in a desired or, alternatively, predetermined space inside or outside the texture processing unit 130 or in the memory 160 outside the graphics processing apparatus 100. When the texture used to generate the pixel value requested by the shader core 120 is not stored in the desired or, alternatively, predetermined space inside the texture processing unit 130, the texture processing unit 130 may bring and use the texture from the desired or, alternatively, predetermined space outside the texture processing unit 130 or from the memory 160.

The pixel processing unit 140 may determine a pixel value to be finally displayed by performing a process such as a depth test performed on pixels corresponding to the same location in one tile and may determine all pixel values corresponding to the one tile.

The tile buffer 150 may store the all pixel values corresponding to the one tile transmitted from the pixel processing unit 140. When graphics processing on all of tiles constituting one frame is completed, a processing result stored in the tile buffer 150 may be transmitted to the frame buffer of the memory 160.

Figure 2:
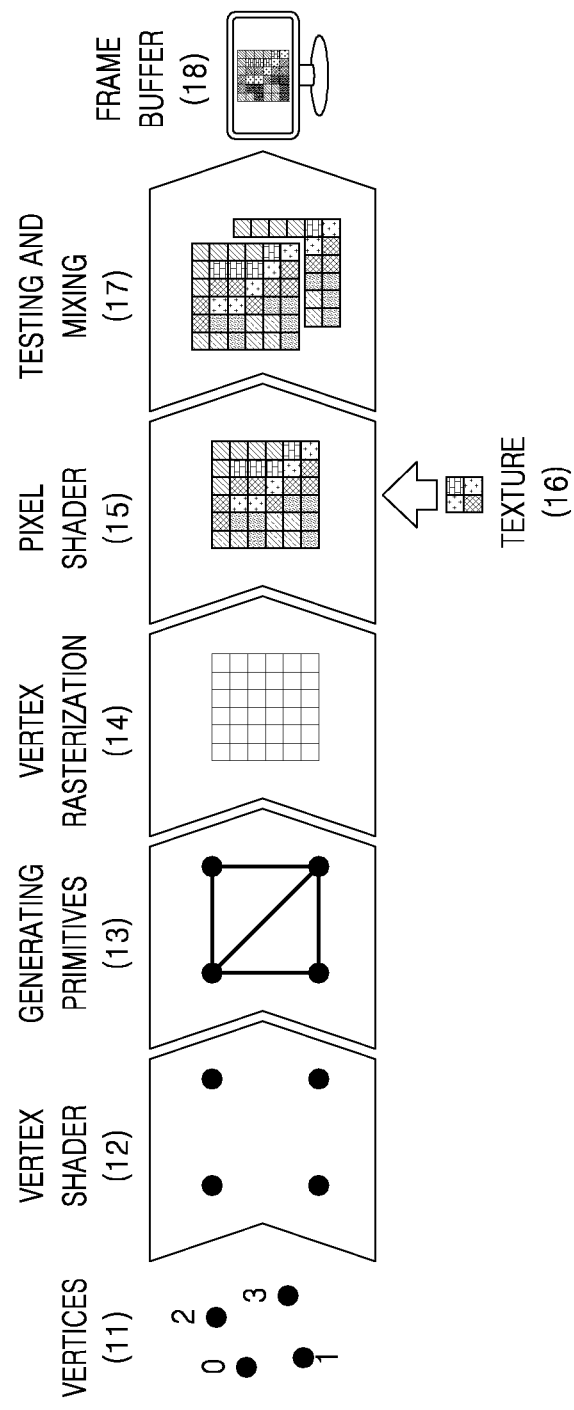
FIG. 2 is a diagram for explaining a process performed by the graphics processing apparatus to process three-dimensional (3D) graphics.

FIG. 2 is a diagram for explaining a process performed by the graphics processing apparatus 100 to process 3D graphics.

A process of processing 3D graphics may be roughly divided into three processes, that is, geometric transformation, rasterization, and pixel shading, which will now be explained in more detail with reference to FIG. 2. Referring to FIG. 2, a process of processing 3D graphics is performed by using operations 11 through 18.

Operation 11 is an operation in which vertices are generated. The vertices are generated in order to represent objects included in 3D graphics.

Operation 12 is an operation in which the generated vertices are shaded. A vertex shader may perform shading on the vertices by designating locations of the vertices that are generated in operation 11.

Operation 13 is an operation in which primitives are generated. The term 'primitive' refers to a point, a line, or a polygon formed by using one or more vertices. For example, a primitive may be a triangle formed by connecting three vertices.

Operation 14 is an operation in which the primitives are rasterized. When a primitive is rasterized, it means that the primitive is divided into fragments. The term 'fragment' may be a basic unit for performing graphics processing on a primitive. Since a primitive includes only information about vertices, 3D graphics processing may be performed by generating fragments between vertices during rasterization.

Operation 15 is an operation in which pixels are shaded. Fragments constituting the primitives and generated during rasterization may be pixels. The terms 'fragment' and 'pixel' are interchangeably used in the art. For example, a pixel shader may be referred to as a fragment shader. In general, a basic unit of graphics processing which constitutes a primitive may be referred to as a fragment and a basic unit of the graphics processing after pixel shading may be referred to as a pixel. Values, attributes (e.g., colors), etc. of the pixels may be determined during pixel shading.

Operation 16 is an operation in which texturing for determining colors of the pixels is performed. The term 'texturing' refers to a process of determining a color of a pixel by using an image that is previously prepared, that is, a texture. In this case, when a color of each pixel is calculated and determined in order to express various colors and patterns in the real world, the number of data computations that are necessary for graphics processing and a graphics processing time increase. Accordingly, a graphics processing apparatus may determine a color of a pixel by using a texture that is previously prepared.

Operation 17 is an operation in which testing and mixing are performed. Pixel values to be finally displayed are determined by performing a process such as a depth test, curling, or clipping.

Operation 18 is an operation in which the frame generated in operations 11 through 17 is stored in a frame buffer and is displayed on a display device.

The process of processing 3D graphics of FIG. 2 has been briefly explained, and more detailed processes are obvious to one of ordinary skill in the art.

Figure 3:
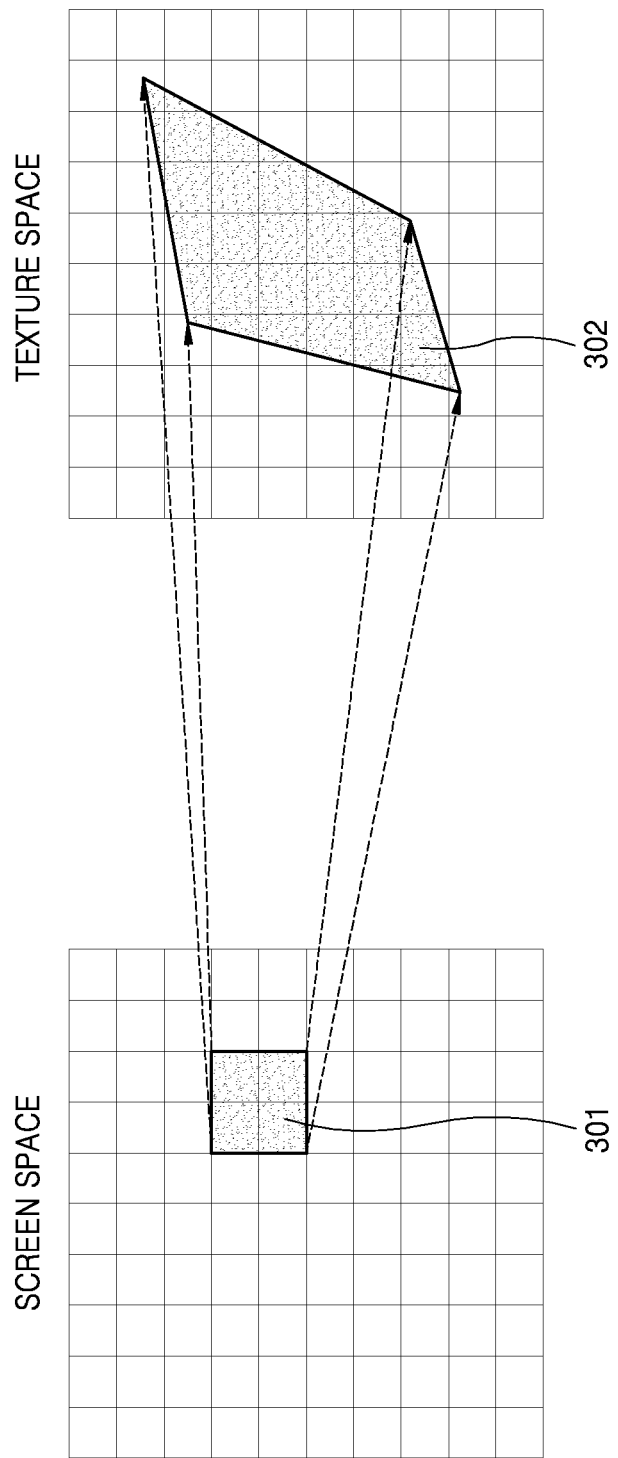
FIG. 3 is a diagram for explaining texture mapping.

FIG. 3 is a diagram for explaining texture mapping.

Referring to FIG. 3, when pixels 301 in a screen space are generated during rasterization, a texture processing unit may determine a texture 302 to be mapped to the pixels 301. In this case, the texture 302 is defined as an image having information about a color, a surface texture, and a pattern of a 3D object and includes texels in a texture space.

Since a size of an object continuously changes in the screen space, it is difficult to prepare the textures 302 corresponding to all of the pixels 301. Accordingly, the texture processing unit may perform texture filtering for estimating values of the pixels 301 through interpolation using one texture or a plurality of textures. A mipmap used to perform texture filtering will now be explained.

Figure 4:
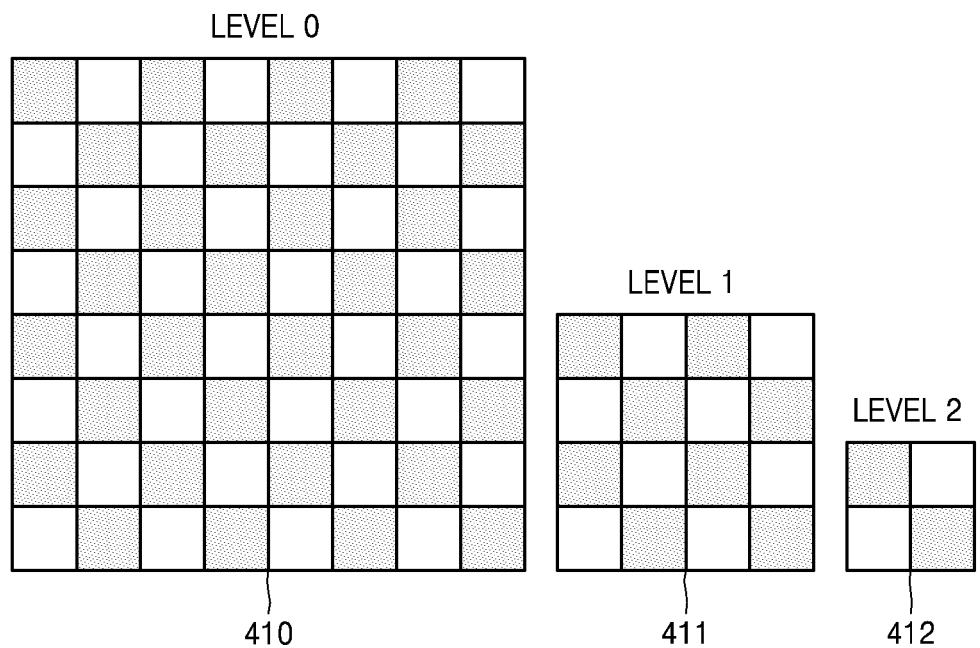
FIG. 4 is a diagram for explaining a mipmap.

FIG. 4 is a diagram for explaining a mipmap.

A texture processing unit may use a texture that is previously prepared, in order to adapt to a size of an object which changes in a screen space. In this case, a bitmap image set including a basic texture and downsized textures thereof is referred to as a mipmap.

In this case, mipmaps of different levels may have different resolutions. Referring to FIG. 4, a level 0 mipmap 410 that is a texture with a highest resolution from among textures may be a basic texture. A mipmap whose size is ¼ a size of the basic texture is a level 1 mipmap 411. A mipmap that is ¹⁄₁₆ the size of the basic texture may be a level 2 mipmap 412. In the example shown in FIG. 4, the level 0 mipmap 410 includes 8×8 texels, Further, the level 1 mipmap 411 includes 4×4 texels, and Further, the level 2 mipmap 412 includes 2×2 texels.

As a distance between a view point and a pixel changes, a texture mapped to the pixel may change. For example, when tiles of a road are displayed in a screen space, a texture mapped to pixels corresponding to a tile close to a view point may be the level 0 mipmap 410 with a high resolution. Further, a texture to be mapped to pixels corresponding to a tile of the road far from the view point may be the level 2 mipmap 412 with a low resolution. For example, when a plurality of mipmaps is used, an object at a far distance is represented at a low resolution, a graphics processing apparatus may naturally represent 3D graphics. In addition, when texture filtering is performed on a boundary between pixels to which different textures are mapped, the quality of the 3D graphics may be improved.

In this case, textures to be mapped to pixels in a screen space may be determined based on a level of detail (LOD) of graphics. The LOD refers to a precision of a 3D graphic image. The texture processing unit may receive pixel information, may determine an LOD value of graphics (e.g., an image or images corresponding to the received pixel information), and may determine which mipmap or mipmaps to use in order to perform texture filtering, based on the determined LOD value. Although the texture processing unit may calculate an LOD value of graphics in units of quads each including, for example, 2×2 pixels, the number of pixels used to calculate the LOD value is not limited to this 2×2 example.

The texture processing unit may perform texture filtering by using one mipmap or a plurality of mipmaps. Although the texture processing unit may perform, for example, point filtering, bilinear filtering, and trilinear filtering, examples of texture filtering performed by the texture processing unit are not limited thereto. Texture filtering will now be explained in detail with reference to FIGS. 5A and 5B.

Figure 5A:
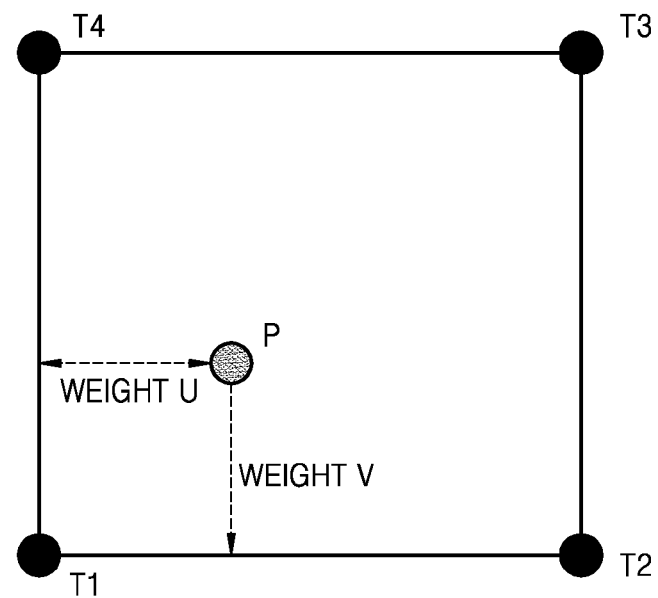
FIG. 5A is a diagram for explaining texture filtering using one mipmap according to at least one example embodiment of the inventive concepts.

FIG. 5A is a diagram for explaining texture filtering using one mipmap according to at least one example embodiment of the inventive concepts.

A texture processing unit may perform point filtering and bilinear filtering by using one mipmap. The point filtering may output a value of a texel closest to a pixel at a texture coordinate as a resultant value. For example, the number of texels used to perform the point filtering is 1.

Referring to FIG. 5A, since a first texel T1 from among the first texel T1 through a fourth texel T4 located around a pixel P is closest to the pixel P, a point filtering result of the pixel P is the first texel T1.

Bilinear filtering is texture filtering for calculating a pixel value by using values of four texels close to a pixel at texture coordinates and two weights. For example, the number of texels used to perform the bilinear filtering is 4.

Referring to FIG. 5A, a pixel value of the pixel P may be calculated by using a weight U, a weight V, and values of the first through fourth texels T1 through T4. In this case, bilinear filtering BiLERP may be defined by using Equation 1.

$$\mathrm{BiLERP}(T1,T2,T3,T4,W_u,W_v) = \mathrm{LERP}(\mathrm{LERP}(T1,T2,W_u),\mathrm{LERP}(T3,T4,W_u),W_v) \quad (1)$$

In Equation 1, $W_u$ and $W_v$ may be respectively the weight U and the weight V, and may each be a value ranging from 0 to 1. T1 through T4 are respectively values of the first through fourth texels T1 through T4. Further, a function LERP that is linear interpolation may be defined by using Equation 2.

$$\mathrm{LERP}(T1,T2,W_u) = (1-W_u) \times T1 + W_u \times T2 \quad (2)$$

Referring to Equation 2, linear interpolation is a method of linearly calculating an arbitrary coordinate between two coordinate values according to a linear distance between the two coordinate values. For example, bilinear filtering is texture filtering of performing linear interpolation on two texel pairs included in one mipmap and performing linear interpolation again based on results of the linear interpolation.

Figure 5B:
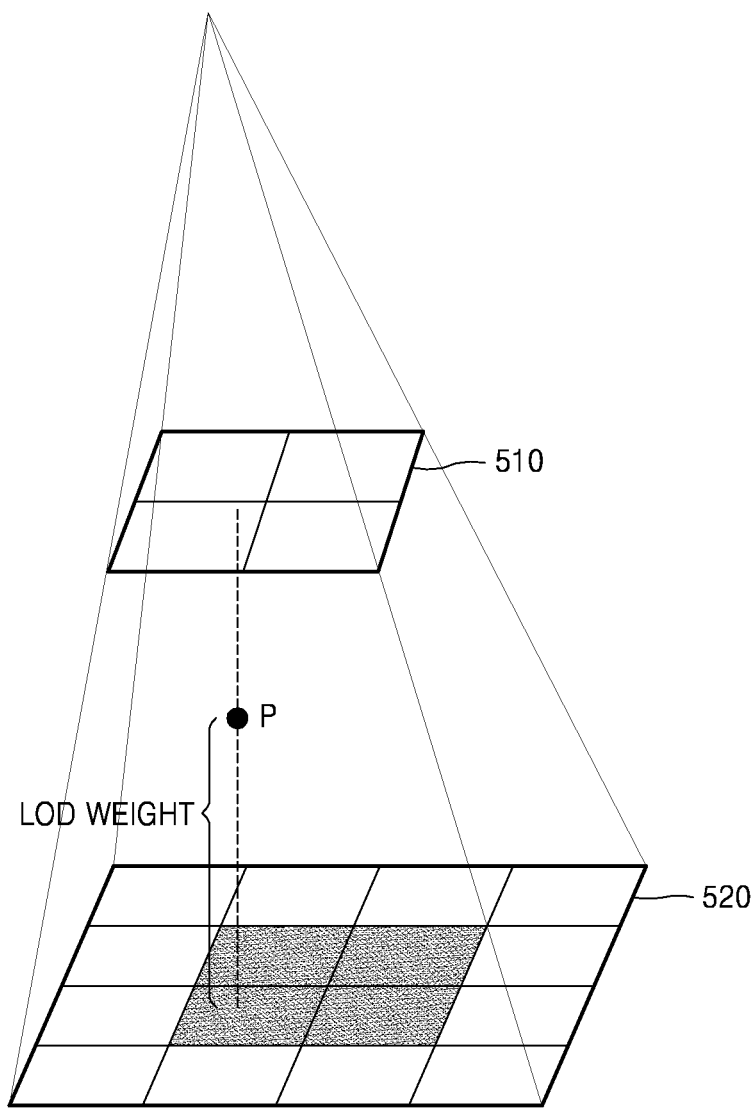
FIG. 5B is a diagram for explaining texture filtering using two mipmaps according to at least one example embodiment of the inventive concepts.

FIG. 5B is a diagram for explaining texture filtering two mipmaps according to at least one example embodiment of the inventive concepts.

A texture processing unit may perform trilinear filtering by using two mipmaps. The trilinear filtering is texture filtering for calculating a pixel value by using a result obtained after performing bilinear filtering on the two mipmaps and an LOD weight. For example, the number of texels used to perform the trilinear filtering is 8. The term 'LOD weight' may refer to a value indicating influences of the determined two mipmaps on texture filtering according to a graphic LOD value.

Referring to FIG. 5B, when the pixel P is located between a first mipmap 510 and a second mipmap 520, the texture processing unit may perform trilinear filtering TriLERP based on Equation 3.

$$\mathrm{TriLERP} = \mathrm{LERP}(\mathrm{BiLERP}_1, \mathrm{BiLERP}_2, W_{LOD}) \quad (3)$$

$\mathrm{BiLERP}_1$ and $\mathrm{BiLERP}_2$ are respectively results obtained after performing bilinear filtering on the first mipmap 510 and the second mipmap 520 and $W_{LOD}$ is an LOD weight. In this case, the LOD weight may be a value ranging from 0 to 1.

Referring to FIG. 5B, when the influence of the first mipmap 510 on texture filtering is greater than the influence of the second mipmap 520 on texture filtering, the pixel P may have the LOD weight greater than 0.5.

Although it is assumed for convenience of explanation that the LOD weight decreases as the influence of the second mipmap 520 on texture filtering increases and the LOD weight increases as the influence of the first mipmap 510 on texture filtering increases, embodiments are not limited thereto.

Although the following is described for convenience of explanation on the assumption that trilinear filtering is used, embodiments are not limited thereto.

Figures 6, 7:
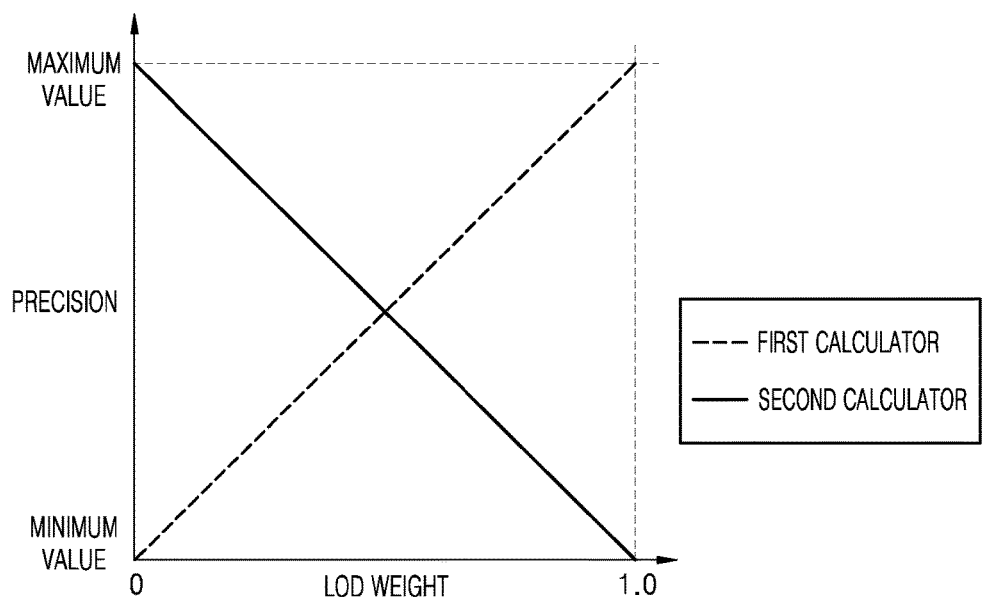
FIG. 6 is a diagram for explaining an amount of calculation performed to perform texture filtering.
FIG. 7 is a graph for explaining a method of determining a first calculator and a second calculator based on a level of detail (LOD) weight according to at least one example embodiment of the inventive concepts.

FIG. 6 is a diagram for explaining an amount of calculation performed to perform texture filtering.

Referring to FIG. 6, in point filtering, since a value of one texel closest to a pixel at a texture coordinate is output, linear interpolation is not performed.

In bilinear filtering, bilinear interpolation is performed on one mipmap. In this case, referring to Equation 1, the bilinear interpolation includes three linear interpolation processes. Accordingly, a texture processing unit may obtain a resultant value of the bilinear filtering by performing linear interpolation three times.

Referring to Equation 3, in trilinear filtering, two bilinear interpolation performed on two mipmaps are included and a linear interpolation performed on bilinear interpolation results is included. Accordingly, the texture processing unit may obtain a resultant value of the trilinear filtering by performing linear interpolation seven times.

For example, as a calculation amount of trilinear filtering of the texture processing unit decreases, a reduction in an overall calculation amount may be greater than that when a calculation amount of other texture filtering types (i.e., point filtering and bilinear filtering) decreases.

FIG. 7 is a graph for explaining a method of determining a first calculator and a second calculator based on an LOD weight according to at least one example embodiment of the inventive concepts.

A texture processing unit may determine a first calculator that performs a calculation on the first mipmap 510 and a second calculator that performs a calculation on the second mipmap 520 based on an LOD weight, and may perform texture filtering by using the first calculator and the second calculator. In detail, the texture processing unit may reduce a calculation amount of trilinear filtering by determining the first calculator and the second calculator from among calculators having different calculation precisions according to influences of the first mipmap 510 and the second mipmap 520 on texture filtering.

The term 'precision' may refer to the number of bits used to represent a desired or, alternatively, predetermined variable. For example, a color value in OpenGL may be stored in an RGBA type, and components (e.g., red, green, blue, and alpha) of the color value may be expressed as an 8-bit integer. In this case, a precision of a texel may be 8 bits.

The first calculator and the second calculator may include a multiplier in order to perform a plurality of linear interpolation processes. Referring to Equations 1 and 2, the multiplier may receive a texel value and weights U and V and may perform multiplication. In this case, an area of a calculator and a calculation amount of the calculator may vary according to a precision of a variable input to the multiplier. For example, when a precision of an input variable is 8 bits, an area and a calculation amount of a multiplier may be respectively 4 times greater than an area and a calculation amount of a multiplier when a precision of an input variable is 4 bits. In addition, as a calculation amount of a calculator increases, power consumption of the calculator may also increase.

A precision of a calculation performed by a calculator may be the number of bits of a weight used in the calculation. For example, when precisions of the weight U and the weight V used in a calculation performed on a mipmap are 4 bits, a precision of the calculation may be 4 bits. In other words, when a precision of a calculation is 4 bits, it may mean that a precision of a weight input to a multiplier of a calculator is 4 bits.

Referring to FIG. 5B, when an influence of the first mipmap 510 on texture filtering is greater than an influence of the second mipmap 520 on texture filtering, an LOD weight is greater than 0.5. In this case, as the LOD weight increases, the texture processing unit of FIG. 7 may determine a calculator having a calculation precision higher than a calculation precision of the second calculator as the first calculator.

Further, as the influence of the first mipmap 510 on texture filtering increases, the texture processing unit may determine a calculator having a high calculation precision as the first calculator.

Further, as a difference between influences of the first mipmap 510 and the second mipmap 520 on texture filtering increases, a difference between a calculation precision of the first calculator and a calculation precision of the second calculator may increase.

Examples of texture filtering using a plurality of mipmaps may include not only trilinear filtering but also anisotropic filtering. It will be understood by one of ordinary skill in the art that although the following is described for convenience of explanation on the assumption that trilinear filtering is used, texture filtering using a plurality of mipmaps other than the trilinear filtering may be used.

Figure 8:
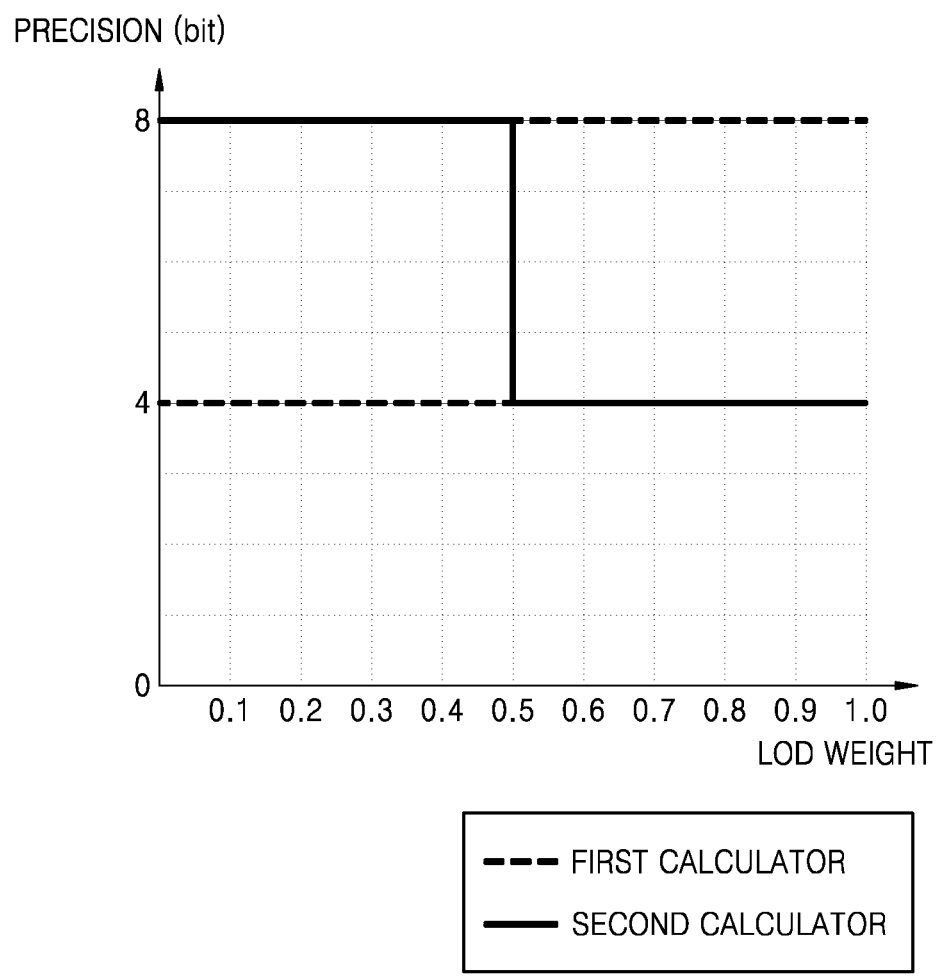
FIG. 8 is a graph for explaining a method of determining a first calculator and a second calculator based on an LOD weight according to another embodiment.

FIG. 8 is a graph for explaining a method of determining a first calculator and a second calculator based on an LOD weight according to another embodiment.

A texture processing unit may divide a range of an LOD weight into a plurality of ranges and may determine a first calculator and a second calculator according to a range in which the LOD weight is included. Further, the texture processing unit may include calculators having different calculation precisions.

Referring to FIG. 8, the texture processing unit may perform texture filtering by using two calculators having calculation precisions of 8 bits and 4 bits. In detail, when an LOD weight is greater than 0.5, the texture processing unit may determine the calculator having the calculation precision of 8 bits as a first calculator and may determine the calculator having the calculation precision of 4 bits as a second calculator. In other words, when the LOD weight is greater than 0.5, precisions of the weight U and the weight V used in a calculation performed on the first mipmap 510 may be 8 bits and precisions of the weight U and the weight V used in a calculation performed on the second mipmap 520 may be 4 bits.

In contrast, when the LOD weight is less than 0.5, the texture processing unit may determine the calculator having the calculation precision of 8 bits as a second calculator and may determine the calculator having the calculation precision of 4 bits as a first calculator.

Figure 9:
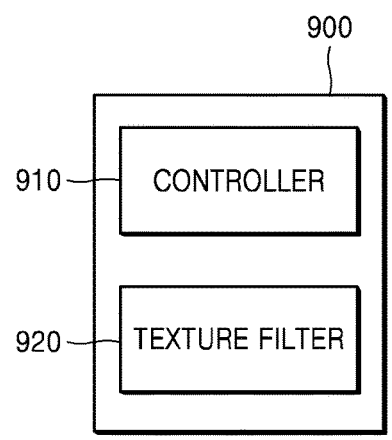
FIG. 9 is a block diagram illustrating a configuration of a texture processing unit according to at least one example embodiment of the inventive concepts.

FIG. 9 is a block diagram illustrating a configuration of a texture processing unit 900 according to at least one example embodiment of the inventive concepts.

Referring to FIG. 9, the texture processing unit 900 may include a controller 910 and a texture filter 920. It will be understood by one of ordinary skill in the art that the texture processing unit 900 may further include general-purpose elements other than elements illustrated in FIG. 9. According to at least some example embodiments, the controller 910 and texture filter 920 are each circuits and may be referred to as the controller circuit 910 and the texture filter circuit 920.

The controller 910 may receive textures from the outside and may perform one or more calculations for controlling the texture processing unit 900. The controller 910 may control an overall operation of the texture processing unit 900 by controlling the texture filter 920.

Further, the controller 910 may determine a first calculator that performs a calculation on the first mipmap 510 and a second calculator that performs a calculation on the second mipmap 520 based on an LOD weight indicating influences of the first mipmap 510 and the second mipmap 520 on texture filtering which are determined according to an LOD value of graphics. In this case, a calculation precision of the first calculator may be different from a calculation precision of the second calculator.

For example, according to at least some example embodiments of the inventive concepts, the controller 910 may receive pixel information of an image, determine an LOD value of the image, and determine the LOD weight indicating influences of the first mipmap 510 and the second mipmap 520, based on the determined LOD value.

According to at least some example embodiments of the inventive concepts, the texture filter circuit 920 may include a plurality of calculators having a plurality of different precisions, respectively. Further, the controller 910 may be configured to determine a level of detail (LOD) value of an image, determine an LOD weight based on the LOD value, select a first calculator having first precision and a second calculator having a second precision based on the LOD weight, control the first calculator to perform a first calculation on a first mipmap, and control the second calculator to perform a second calculation on a second mipmap. The first and second calculators selected by the controller 910 may be calculators from among the plurality of calculators included in the texture filter circuit 920, and the first and second precisions of the selected first and second calculators, respectively, may be different precisions.

Further, a weight used in the calculation performed on the first mipmap 510 and a weight used in the calculation performed on the second mipmap 520 may vary according to the LOD weight.

Further, the controller 910 may divide a range of the LOD weight into a plurality of ranges and may determine the first calculator and the second calculator according to a range in which the LOD weight is included.

Further, the controller 910 may divide a range of the LOD weight based on the number of combinations according to calculation precisions of calculators included in the texture filter 920.

Further, as an influence of the first mipmap 510 on texture filtering increases, the controller 910 may determine a calculator having a high calculation precision as the first calculator.

Further, as an influence of the first mipmap 510 on texture filtering increases to be higher than that of the second mipmap 520 on texture filtering, the controller 910 may determine a calculator having a calculation precision higher than a calculation precision of the second calculator as the first calculator.

As a difference between influences of the first mipmap 510 and the second mipmap 520 on texture filtering increases, a difference between calculation precisions of the first calculator and the second calculator may increase.

An area of each of the first calculator and the second calculator may be proportional to a calculation precision.

Further, the texture filter 920 may perform texture filtering by using the first calculator and the second calculator.

Further, when a range in which the LOD weight is included is a range in which a maximum value or a minimum value of the LOD weight is included, any one from among the first calculator and the second calculator may output a texel value included in a mipmap having a smaller influence on texture filtering from among the first mipmap 510 and the second mipmap 520.

Figure 10:
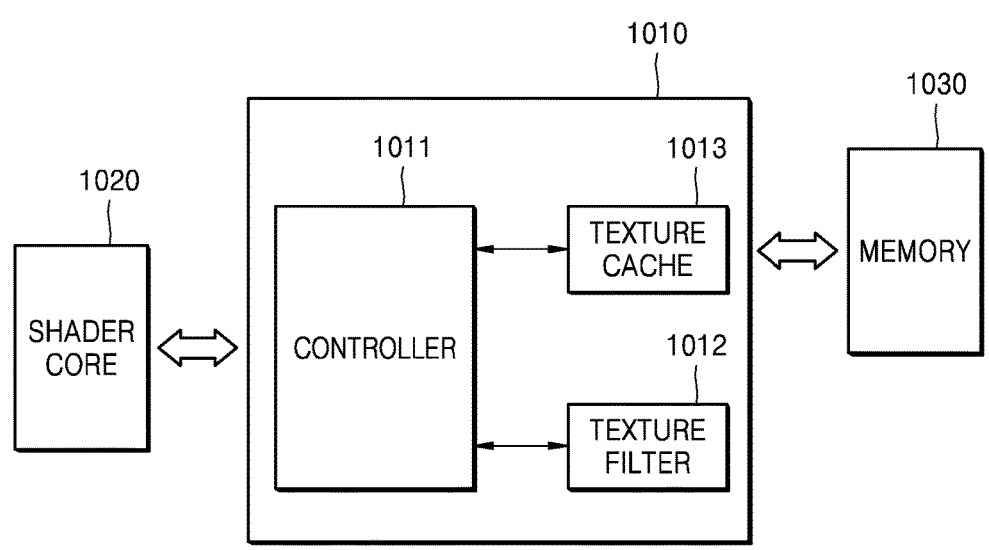
FIG. 10 is a block diagram illustrating a configuration of a graphics processing apparatus according to at least one example embodiment of the inventive concepts.

Further, the controller 910 may determine a precision of a calculation performed on the first mipmap 510 and a precision of a calculation performed on the second mipmap 520 based on the LOD weight and the texture filter 920 may change a calculation precision of the first calculator and a calculation precision of the second calculator based on the determined precisions of the calculations. According to at least some example embodiments of the inventive concepts, the texture filter 920 may include a plurality of calculators (e.g., calculator circuits) at least some of which have precisions that differ from each other, and the controller 910 may select from among the plurality of calculators based on the LOD weight. FIG. 10 is a block diagram illustrating a configuration of a graphics processing apparatus according to at least one example embodiment of the inventive concepts.

Referring to FIG. 10, a texture processing unit 1010 may include a controller 1011, a texture filter 1012, and a texture cache 1013. The texture processing unit 1010 may process a texture requested by a shader core 1020 and may transmit the processed texture to the shader core 1020. The texture processing unit 1010 may receive a texture request including a texture coordinate corresponding to a pixel to be processed by the shader core 1020. For example, the pixel may be included in the texture request in units of quads. The texture processing unit 1010 may bring a texture that is not stored in the texture cache 1013 from a memory 1030.

According to at least one example embodiments, the texture processing unit 1010 is an example implantation of the texture processing unit 900 of FIG. 9. The controller 1011 and the texture filter 1012 respectively correspond to the controller 910 and the texture filter 920 of FIG. 9, and thus a detailed explanation thereof will not be given.

The texture cache 1013 may store a texture. The texture cache 1013 may store some textures received from the memory 1030 in order to reduce or, alternatively, minimize a graphics processing delay time according to data transfer between the texture processing unit 1010 and the memory 1030.

The texture cache 1013 may exist as a module separate from the texture processing unit 1010. For example, the texture cache 1013 may be located as a separate module between the texture processing unit 1010 and the memory 1030.

Figure 11:
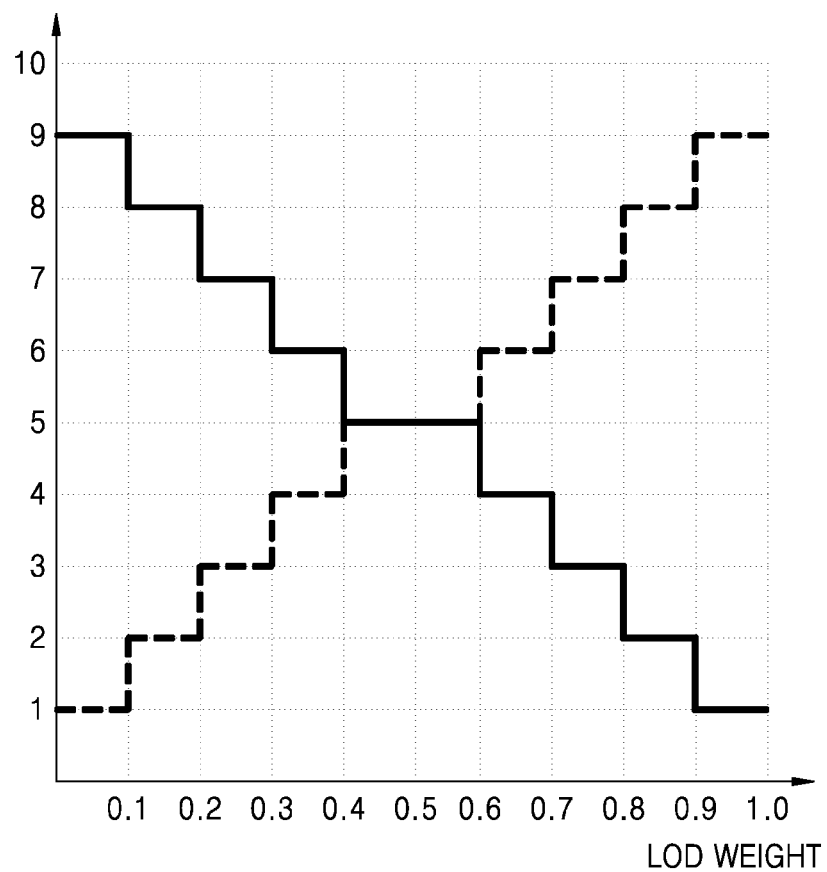
FIG. 11 is a graph for explaining a method of determining a first calculator and a second calculator based on an LOD weight according to another embodiment.

FIG. 11 is a graph for explaining a method of determining a first calculator and a second calculator based on an LOD weight according to another embodiment.

As the number of calculators included in the texture processing unit 900 increases, the texture processing unit 900 may more precisely select a first calculator and a second calculator according to an LOD weight whereas an area of the texture processing unit 900 may increase.

Referring to FIG. 11, the texture processing unit 900 may perform texture filtering by using nine calculators having calculation precisions of 9 bits through 1 bit. For example, when an LOD weight is 0.15, the texture processing unit 900 may determine a calculator having a calculation precision of 2 bits as a first calculator and may determine a calculator having a calculation precision of 8 bits as a second calculator. When the LOD weight is 0.95, the texture processing unit 900 may determine a calculator having a calculation precision of 9 bits as a first calculator and may determine a calculator having a calculation precision of 1 bit as a second calculator.

Since the texture processing unit 900 of FIG. 11 includes more calculators than the texture processing unit 900 of FIG. 8, the texture processing unit 900 of FIG. 11 may more precisely determine the first calculator and the second calculator according to the LOD weight. However, an area of the texture processing unit 900 of FIG. 11 may be greater than that of the texture processing unit 900 of FIG. 8.

Figure 12A:
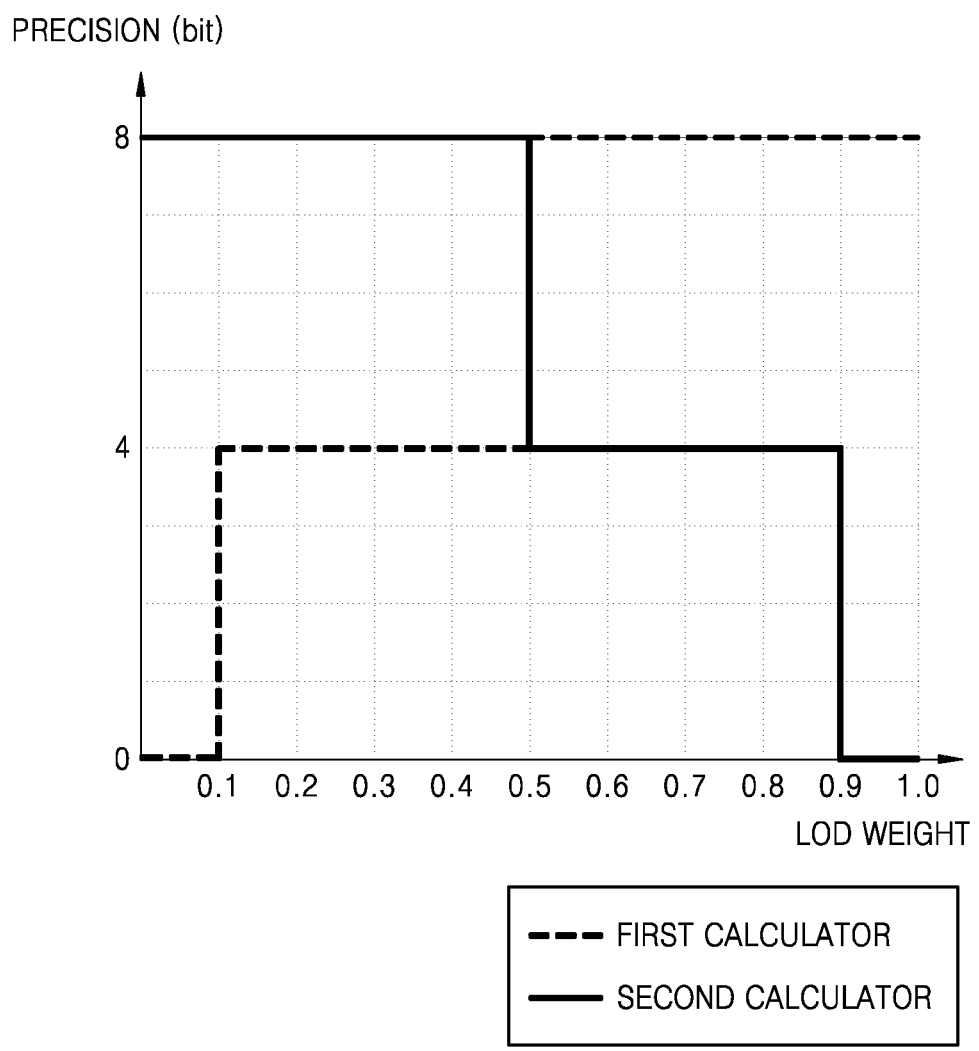
FIGS. 12A and 12B are graphs for explaining a method of determining a first calculator and a second calculator when an LOD weight is included in a range in which a maximum value or a minimum value of the LOD weight is included according to at least one example embodiment of the inventive concepts.
Figure 12B:
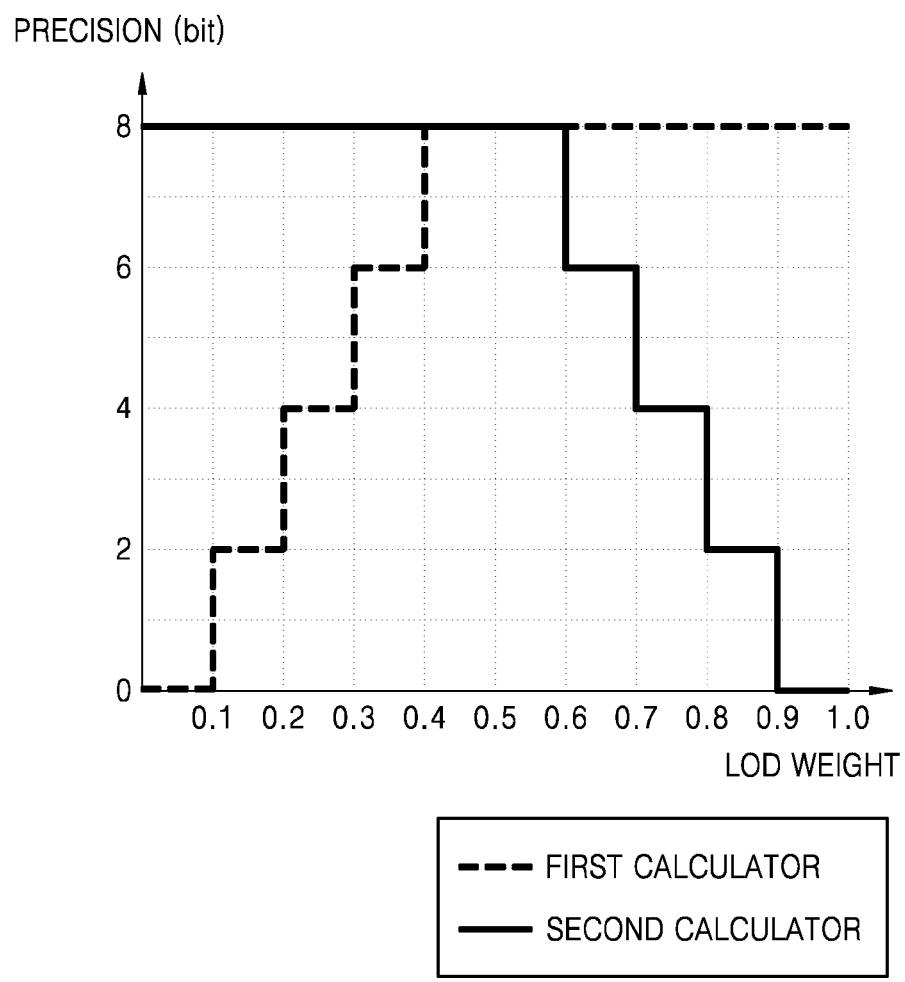

FIGS. 12A and 12B are graphs for explaining a method of determining a first calculator and a second calculator when an LOD weight is included in a range in which a maximum value or a minimum value of the LOD weight is included according to at least one example embodiment of the inventive concepts.

The texture processing unit 900 may change texture filtering according to an LOD weight. In detail, according to at least some example embodiments of the inventive concepts, when the LOD weight is (i) below a lower threshold value or, alternatively, a minimum value, or (ii) above an upper threshold value or, alternatively, a maximum value, any one from among a first calculator and a second calculator may perform point filtering for the mipmap having the smaller influence on texture filtering from among the first mipmap 510 and the second mipmap 520. For example, any one from among the first calculator and the second calculator may output a texel value included in a mipmap having a smaller influence on texture filtering from among the first mipmap 510 and the second mipmap 520, for example, in response to the control of the controller 910.

Referring to FIG. 12A, the texture processing unit 900 may include three calculators having calculation precisions of 8 bits, 4 bits, and no bit. In this case, when the LOD weight is less than 0.1, the texture processing unit 900 may determine the calculator having the calculation precision of no bit as the first calculator. When a calculation precision is no bit, it means that precisions of the weights U and V used to perform bilinear filtering are no bit. In other words, a calculator having a calculation precision of no bit refers to a calculator for performing point filtering, instead of bilinear filtering.

Accordingly, when the LOD weight is less than 0.1, the texture processing unit 900 may perform point filtering on the first mipmap 510 and may perform bilinear filtering on the second mipmap 520 by using the second calculator having the calculation precision of 8 bits. Further, when the LOD weight is greater than 0.9, the texture processing unit 900 may perform point filtering on the second mipmap 520, and may perform bilinear filtering on the first mipmap 510 by using the first calculator having the calculation precision of 8 bits.

The texture processing unit 900 may perform point filtering by using the calculator having the calculation precision of 4 bits without separately adding a calculator for performing point filtering.

Since the texture processing unit 900 of FIG. 12A performs point filtering, instead of bilinear filtering, on one mipmap, the texture processing unit 900 of FIG. 12A may have a calculation amount less than that of the texture processing unit 900 of FIG. 9. Further, when the texture processing unit 900 of FIG. 12A performs point filtering by using the calculator having the calculation precision of 4 bits, the texture processing unit 900 of FIG. 12A may have an area and a calculation amount that are respectively the same as and less than those of the texture processing unit 900 of FIG. 8.

The texture processing unit 900 of FIG. 12B may more precisely select a first calculator and a second calculator by changing a calculation performed on a mipmap according to an LOD weight, like the texture processing unit 900 of FIG. 12A.

Referring to FIG. 12B, the texture processing unit 900 may perform texture filtering by using five calculators having calculation precisions of 8 bits, 6 bits, 4 bits, 2 bits, and no bit. For example, when an LOD weight is 0.25, the texture processing unit 900 may determine the calculator having the calculation precision of 4 bits as a first calculator and may determine the calculator having the calculation precision of 8 bits as a second calculator. Further, when the LOD weight is 0.95, the texture processing unit 900 may determine the calculator having the calculation precision of 8 bits as a first calculator and may determine the calculator having the calculation precision of no bit as a second calculator. In this case, the texture processing unit 900 may perform point filtering, instead of bilinear filtering, on a second mipmap. The texture processing unit 900 may perform point filtering by using other calculators without adding a calculator for performing point filtering.

Since the texture processing unit 900 of FIG. 12B further includes two calculators having different calculation precisions, unlike the texture processing unit 900 of FIG. 12A, the texture processing unit 900 of FIG. 12B may more precisely select the first calculator and the second calculator according to the LOD weight. However, an area of the texture processing unit 900 of FIG. 12B may be greater than that of the texture processing unit 900 of FIG. 12A.

Although it is assumed in FIGS. 12A and 12B for convenience of explanation that a first threshold value for determining that point filtering is to be performed on a first mipmap is 0.1 and a second threshold value of determining that point filtering is to be performed on a second mipmap is 0.9, the first threshold value and the second threshold value are not limited thereto.

FIG. 13 is a diagram for explaining a change in a calculation amount of texture filtering according to at least one example embodiment of the inventive concepts.

FIG. 13 illustrates a relationship between a final calculation amount (ratio) and a calculator configuration when a final calculation amount of trilinear filtering using two calculators having calculation precisions of 8 bits is 100%. When an RGBA type of OpenGL is used, components (e.g., red, green, blue, and alpha) may be expressed as an 8-bit integer. Accordingly, for comparison of calculation amounts, it is assumed that a precision of a texel used in texture filtering is 8 bits and a calculation precision of any one from among two calculators is 8 bits.

Referring to FIG. 13, in 'a×b' in each calculator configuration, a and b respectively denote a precision of a texel and a calculation precision. Further, in 'A+B', A and B respectively denote precisions of calculators. In other words, since it is assumed in FIG. 13 that a texture processing unit uses two calculators, 'a×b+c×d' may be shown. For example, when a calculator configuration is '8×8+8×6', calculation precisions of calculators may be 8 bits and 6 bits.

When a calculator configuration is '8×8 and 8×4', a final calculation amount of texture filtering may be 78.5% by varying a first calculator and a second calculator according to an LOD weight. Accordingly, a calculation amount may be less by 21.5% than that when two calculators having calculation precisions of 8 bits are used.

Further, when a calculator configuration is '8×8 and 8×0', a final calculation amount of texture filtering may be 57.1% by varying a first calculator and a second calculator according to an LOD weight. According to at least some example embodiments of the inventive concepts, the final calculation amount indicates a total amount of calculation performed by, for example, the texture processing unit 900 to complete a texture processing operation (e.g., a texture filtering operation).

Referring to FIG. 13, when a calculation precision of one calculator included in the texture processing unit 900 decreases, a final calculation amount may decrease. Further, once the final calculation amount decreases, power consumption may decrease. In addition, since an area of a calculator may be proportional to a calculation precision, the texture processing unit 900 may include a calculator having a small area according to a calculation precision.

Further, the texture processing unit 900 may be realized by using existing hardware by applying only some part to two calculators having the same calculation precision, for example, based on the control of the controller 910.

When a final calculation amount decreases, an accuracy of texture filtering may decrease. For example, when a calculation precision of a calculator included in a calculator configuration decreases, the number of errors increases. Referring to FIG. 13, an error maximum value is the number of errors corresponding to variables having values that fall outside a range defined by a minimum value and a maximum value of a variable when an OpenGL ES 3.2 conformance test is performed. When a component of an RGBA type is 8 bits, the component may pass the OpenGL ES 3.2 conformance test when the number of errors is equal to or less than 8.

Accordingly, when a final calculation amount (ratio) and an error maximum value are considered, a calculator configuration 1310 including a calculator having a calculation precision of 4 bits may be determined to satisfy conditions of the OpenGL ES 3.2 conformance test and have a smallest calculation amount. A calculator configuration of the texture processing unit 900 may be determined based on desired quality. For example, a calculator configuration for further reducing a final calculation amount may be applied to the texture processing unit 900 and a calculator configuration for further reducing the number of errors may be applied to the texture processing unit 900.

FIG. 14 is a flowchart of a texture processing method according to at least one example embodiment of the inventive concepts.

In operation 1410, the controller 910 may determine a first calculator that performs a calculation on the first mipmap 510 and a second calculator that performs a calculation on the second mipmap 520 based on an LOD weight indicating influences of the first mipmap 510 and the second mipmap 520 on texture filtering which are determined according to an LOD value of graphics. In this case, a calculation precision of the first calculator may be different from a calculation precision of the second calculator.

Further, a weight used in the calculation performed on the first mipmap 510 and a weight used in the calculation performed on the second mipmap 520 may vary according to the LOD weight.

Further, the controller 910 may divide a range of the LOD weight into a plurality of ranges, and may determine the first calculator and the second calculator according to a range in which the LOD weight is included.

Further, the controller 910 may divide a range of the LOD weight based on a total or, alternatively, desired number of combinations (e.g., combinations of different calculation precisions) according to calculation precisions of calculators included in the texture filter 920. For example, the controller 910 controller may be configured to divide a range of the LOD weight based on total or, alternatively, desired number of combinations of calculation precisions from among the calculation precisions of a plurality of calculators included in the texture filter 920.

Further, as an influence of the first mipmap 510 on texture filtering increases, the controller 910 may determine a calculator having a high calculation precision as the first calculator.

Further, as an influence of the first mipmap 510 on texture filtering increases to be higher than an influence of the second mipmap 520 on texture filtering, the controller 910 may determine a calculator having a calculation precision higher than a calculation precision of the second calculator as the first calculator.

As a difference between influences of the first mipmap 510 and the second mipmap 520 on texture filtering increases, a difference between calculation precisions of the first calculator and the second calculator may increase.

In operation 1420, the texture filter 920 may perform texture filtering by using the first calculator and the second calculator.

Further, according to at least some example embodiments of the inventive concepts, when the LOD weight is (i) below a lower threshold value or, alternatively, a minimum value, or (ii) above an upper threshold value or, alternatively, a maximum value, any one from among the first calculator and the second calculator may output a texel value included in a mipmap having a smaller influence on texture filtering from among the first mipmap 510 and the second mipmap 520.

Further, the controller 910 may determine a precision of a calculation performed on the first mipmap 510 and a precision of a calculation performed on the second mipmap 520 based on the LOD weight and the texture filter 920 may change a calculation precision of the first calculator and a calculation precision of the second calculator based on the determined precisions of the calculations.

Figure 15:
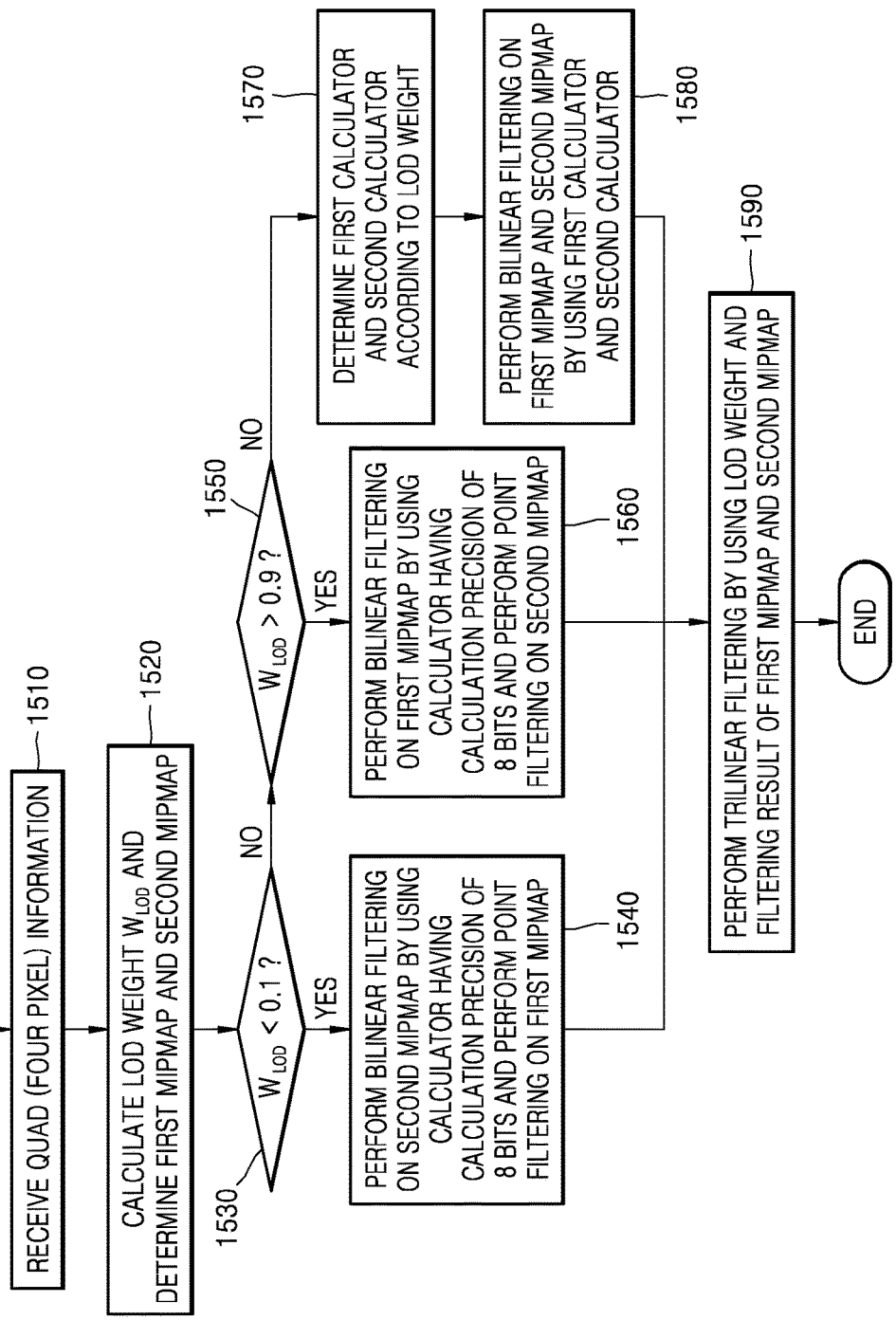
FIG. 15 is a detailed flowchart of a texture processing method according to at least one example embodiment of the inventive concepts.

FIG. 15 is a detailed flowchart of a texture processing method according to at least one example embodiment of the inventive concepts.

FIG. 15 is a detailed flowchart for explaining a method performed by the texture processing unit 900 of FIG. 12 to process a texture. It will be understood by one of ordinary skill in the art that a method of performing texture filtering may vary according to a calculator configuration of the texture processing unit 900.

In operation 1510, the controller 910 may receive quad information. In this case, the quad may be a unit of pixels to which a texture is to be mapped and may include a set of 2×2 pixels. Further, the quad information may be included in a texture request and may be received from the shader core 1020.

In operation 1520, the controller 910 may calculate an LOD weight based on the quad information and may determine the first mipmap 510 and the second mipmap 520 used for texture filtering.

In operation 1530, the controller 910 may determine whether the LOD weight is less than 0.1. If it is determined in operation 1530 that the LOD weight is less than 0.1, operation 1540 may be performed. Otherwise, operation 1550 may be performed.

In operation 1540, the texture processing unit 900 may perform bilinear filtering on the second mipmap 520 by using a calculator having a calculation precision of 8 bits and may perform point filtering on the first mipmap 510. For example, if it is determined that the LOD weight is less than 0.1, the texture processing unit 900 may perform bilinear filtering only on the second mipmap 520 having a relatively large influence on texture filtering and may perform point filtering on the first mipmap 510, in order to reduce a calculation amount.

In operation 1550, the controller 910 may determine whether the LOD weight is greater than 0.9. If it is determined in operation 1550 that the LOD weight is greater than 0.9, operation 1560 may be performed. Otherwise, operation 1570 may be performed.

In operation 1560, the texture processing unit 900 may perform bilinear filtering on the first mipmap 510 by using a calculator having a calculation precision of 8 bits and may perform point filtering on the second mipmap 520. For example, if it is determined that the LOD weight is greater than 0.9, the texture processing unit 900 may perform bilinear filtering only on the first mipmap 510 having a relatively large influence on texture filtering and may perform point filtering on the second mipmap 520, in order to reduce a calculation amount.

In operation 1570, the controller 910 may determine a first calculator and a second calculator according to the LOD weight. The first calculator refers to a calculator that performs a calculation on the first mipmap 510 and the second calculator refers to a calculator that performs a calculation on the second mipmap 520. In this case, a calculation precision of the first calculator may be different from a calculation precision of the second calculator. Further, a precision of a weight used in the calculation performed on the first mipmap 510 may be different from a precision of a weight used in the calculation performed on the second mipmap 520. When a precision of each weight changes, the number of bits of the weight may change, and thus a value of the weight to be used in calculation may change.

For example, if it is determined that the LOD weight is greater than 0.5, a calculator having a calculation precision of 8 bits may be determined as the first calculator and a calculator having a calculation precision of 4 bits may be determined as the second calculator.

In operation 1580, the texture filter 920 may perform bilinear filtering on the first mipmap 510 and the second mipmap 520 by using the first calculator and the second calculator.

In operation 1590, the texture filter 920 may perform trilinear filtering by using the LOD weight and a filtering result of the first mipmap 510 and the second mipmap 520.

According to the one or more embodiments, the quality of 3D graphics may be maintained, an area of a texture processing unit may be reduced, and a calculation amount and power consumption of the texture processing unit may be reduced, for example, by varying a precision of a calculation performed on a first mipmap and a precision of a calculation performed on a second mipmap according to influences of the first mipmap and the second mipmap on texture filtering.

A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

At least some example embodiments of the inventive concepts can be embodied by a processor executing computer-executable code that is stored on a computer-readable medium. Program code including computer-executable instructions for causing processor to perform operations according to at least some example embodiments may be stored on a non-transitory computer-readable storage medium, such as random access memory (RAM), read only memory (ROM), a permanent mass storage device (such as a disk drive), and/or any other like data storage mechanism capable of storing and recording data. Examples of non-transitory computer-readable storage media include, but are not limited to, flash memory, Blu-ray discs, DVDs, CDs, floppy disks, hard disk drives (HDDs), solid-state drives (SSDs), dynamic RAM (DRAM), synchronous DRAM (SDRAM), and static RAM (SRAM).

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A texture processing unit comprising:
a controller configured to determine a first calculator that performs a calculation on a first mipmap and a second calculator that performs a calculation on a second mipmap, based on a level of detail (LOD) weight indicating influences of the first mipmap and the second mipmap on texture filtering, the influences being based on an LOD value of graphics; and
a texture filter configured to perform the texture filtering by using the first calculator and the second calculator,
wherein a calculation precision of the first calculator is different from a calculation precision of the second calculator.

2. The texture processing unit of claim 1, wherein a weight used in the calculation performed on the first mipmap and a weight used in the calculation performed on the second mipmap vary according to the LOD weight.

3. The texture processing unit of claim 1, wherein the controller is further configured to divide a range of the LOD weight into a plurality of ranges and determine the first calculator and the second calculator according to which one of the plurality of ranges the LOD weight is included within.

4. The texture processing unit of claim 3, wherein the texture filter includes a plurality of calculators each of which has one of a plurality of different precisions, and the controller is further configured to divide the range of the LOD weight based on a number of possible combinations of calculation precisions from among the plurality of different precisions.

5. The texture processing unit of claim 3, wherein the controller is configured such that, when the LOD weight is below a lower threshold value or above an upper threshold value, the controller controls one of the first calculator or the second calculator to output a texel value included a mipmap, from among the first mipmap and the second mipmap, that has a smaller influence on the texture filtering.

6. The texture processing unit of claim 1, wherein the controller is further configured to, determine a calculator having an increased calculation precision as the first calculator, when the controller determines that the influence of the first mipmap on the texture filtering has increased.

7. The texture processing unit of claim 1, wherein the controller is further configured such that, when the influence of the first mipmap on the texture filtering is higher than the influence of the second mipmap on the texture filtering, the controller determines the first calculator and the second calculator such that the first calculator has a precision higher than the second calculator.

8. The texture processing unit of claim 1, wherein the controller is configured to determine the first calculator and the second calculator such that, when the controller determines that a first difference has increased, a second difference is increased by the controller the first difference being a difference between the influences of the first mipmap and the second mipmap on the texture filtering, the second difference being a difference between the calculation precision of the first calculator and the calculation precision of the second calculator.

9. The texture processing unit of claim 1, wherein, the controller is further configured to determine a precision of the calculation performed on the first mipmap and a precision of the calculation performed on the second mipmap based on the LOD weight, and the texture filter is further configured to change the calculation precision of the first calculator and the calculation precision of the second calculator based on the determined precision of the calculation performed on the first mipmap and the determined precision of the calculation performed on the second mipmap.

10. The texture processing unit of claim 1, wherein sizes of areas of the first calculator and the second calculator are proportional to magnitudes of the calculation precision of the first calculator and the calculation precision of the second calculator.

11. A texture processing method comprising: determining a first calculator that performs a calculation on a first mipmap and a second calculator that performs a calculation on a second mipmap, based on a level of detail (LOD) weight indicating influences of the first mipmap and the second mipmap on texture filtering which are determined according to an LOD value of graphics; and performing the texture filtering by using the first calculator and the second calculator, wherein a calculation precision of the first calculator is different from a calculation precision of the second calculator.

12. The texture processing method of claim 11, wherein a weight used in the calculation performed on the first mipmap and a weight used in the calculation performed on the second mipmap vary according to the LOD weight.

13. The texture processing method of claim 11, wherein the determining of the first calculator and the second calculator comprises:
dividing a range of the LOD weight into a plurality of ranges; and
determining the first calculator and the second calculator according to which one of the plurality of ranges the LOD weight is included within.

14. The texture processing method of claim 13, wherein the dividing of the range of the LOD weight into the plurality of ranges comprises dividing the range of the LOD weight based on a number of possible combinations of calculation precisions of a plurality of calculators included in a texture filter.

15. The texture processing method of claim 13, wherein the performing of the texture filtering comprises, when a maximum value or a minimum value of the LOD weight is included in a range in which the LOD value is included, causing one of the first calculator or the second calculator to output a texel value included in a mipmap having a smaller influence on the texture filtering from among the first mipmap and the second mipmap.

16. A texture processing apparatus comprising:
   a controller; and
   a texture filter circuit including a plurality of calculators having a plurality of different precisions, respectively,
   the controller being configured to,
   determine a level of detail (LOD) value of an image,
   determine an LOD weight based on the LOD value,
   select, based on the LOD weight, a first calculator having first precision and a second calculator having a second precision,
   control the first calculator to perform a first calculation on a first mipmap, and
   control the second calculator to perform a second calculation on a second mipmap,
   the first and second calculators being calculators from among the plurality of calculators,
   the first and second precisions being different precisions.

17. The texture processing apparatus of claim 16, wherein, the texture filter circuit is configured to perform a texture filtering operation on the first and second mipmaps, and the first and second calculations are calculations included in the texture filtering operation.

18. The texture processing apparatus of claim 17, wherein the texture filtering operation is a bilinear filtering operation.

19. The texture processing apparatus of claim 18, wherein the LOD weight is an indication of levels of influence of the first mipmap and the second mipmap on the texture filtering operation.

20. The texture processing apparatus of claim 17, wherein the LOD weight is an indication of levels of influence of the first mipmap and the second mipmap on the texture filtering operation.

* * * * *